E. HICKS.
SANITARY NON-FREEZING WATERING FOUNTAIN.
APPLICATION FILED MAY 4, 1917.
1,258,620.
Patented Mar. 5, 1918.
3 SHEETS—SHEET 2.
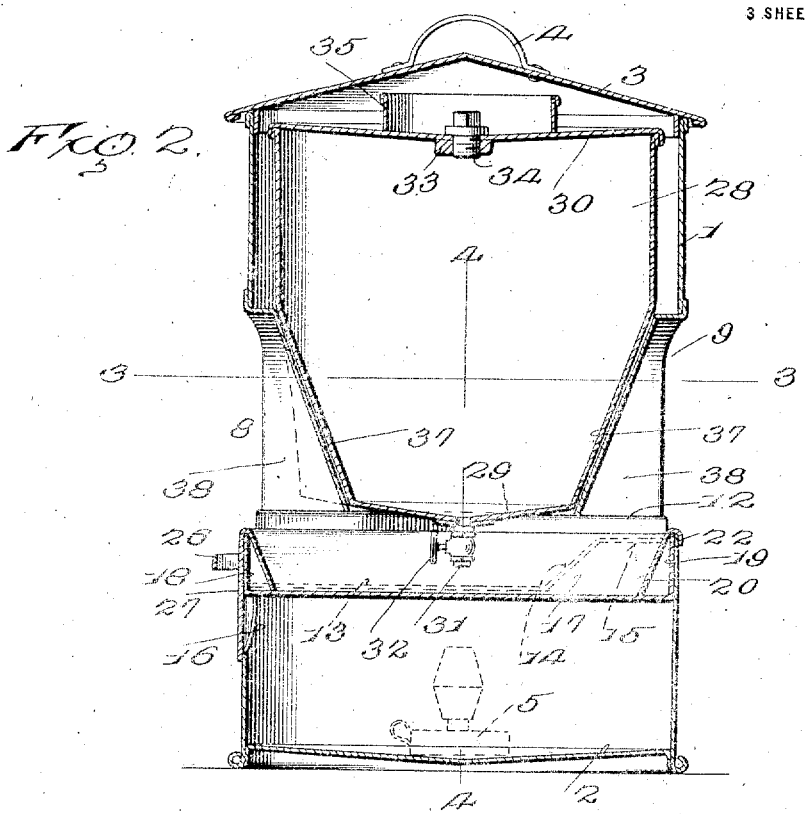
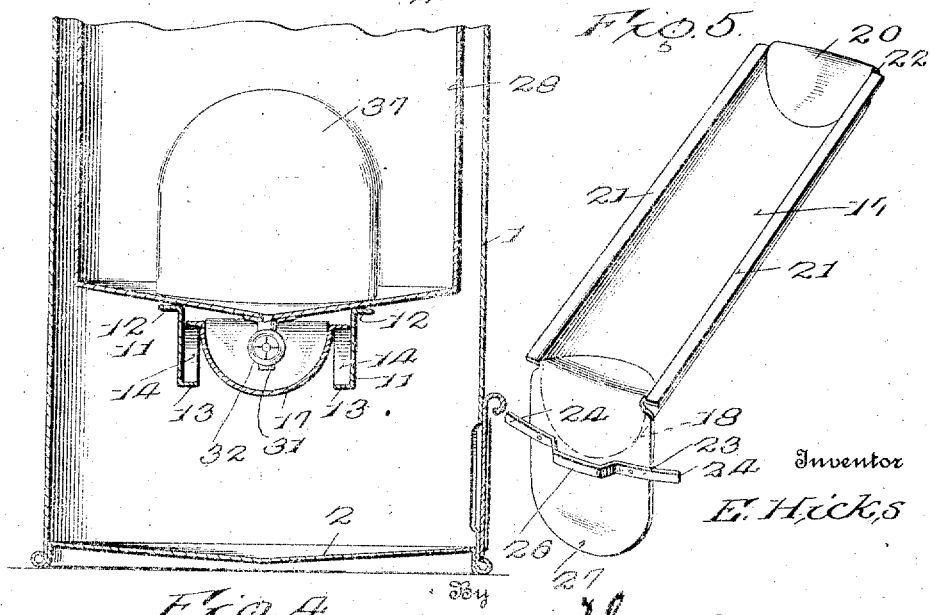
Inventor
E. Hicks,
By E. HICKS.
SANITARY NON-FREEZING WATERING FOUNTAIN.
APPLICATION FILED MAY 4, 1917.
1,258,620.
Patented Mar. 5, 1918.
3 SHEETS—SHEET 3.
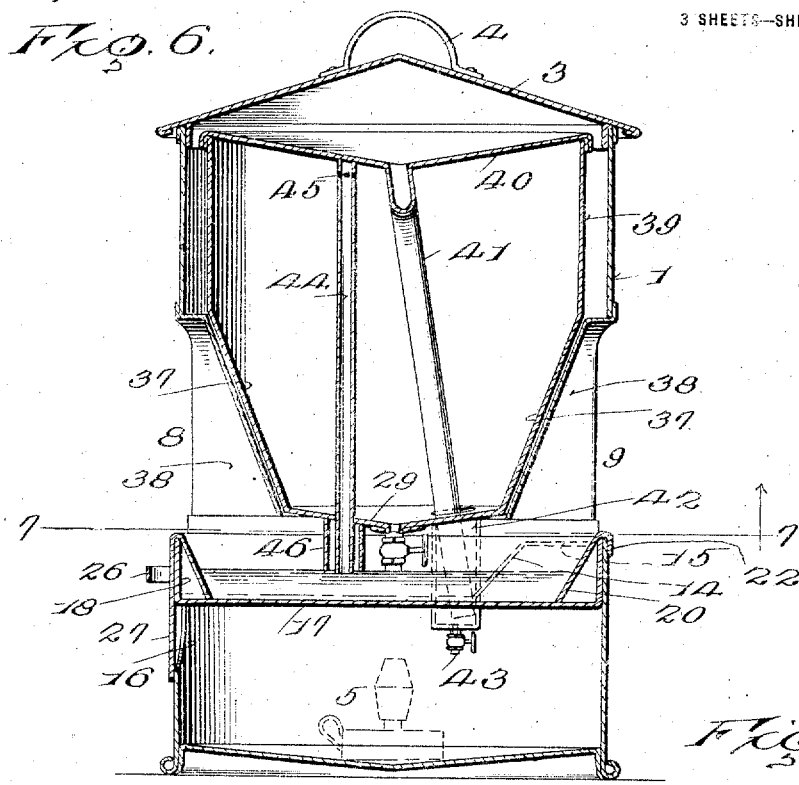
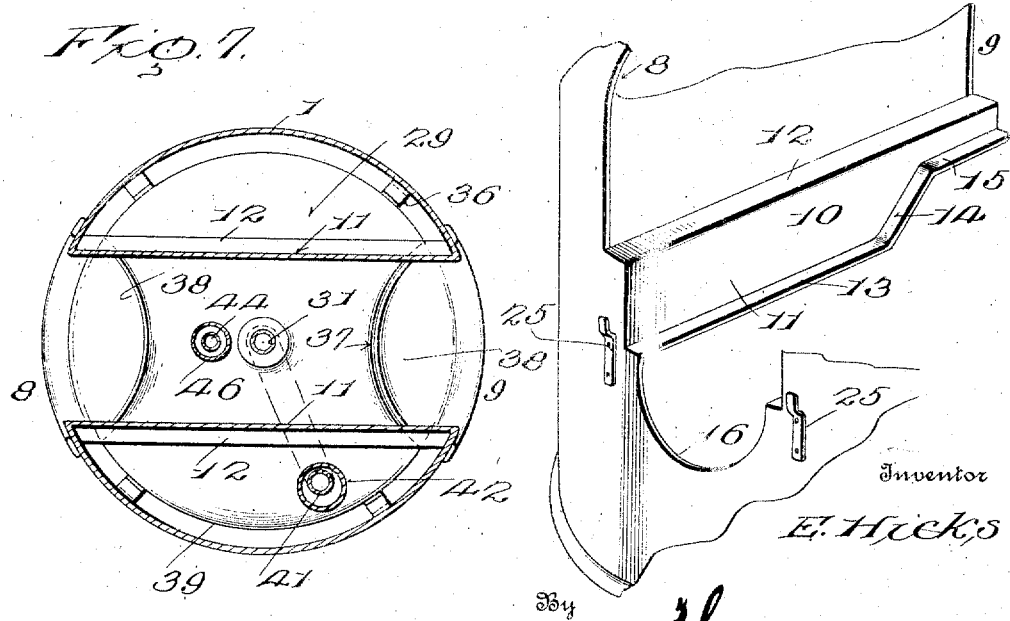
Inventor
E. Hicks

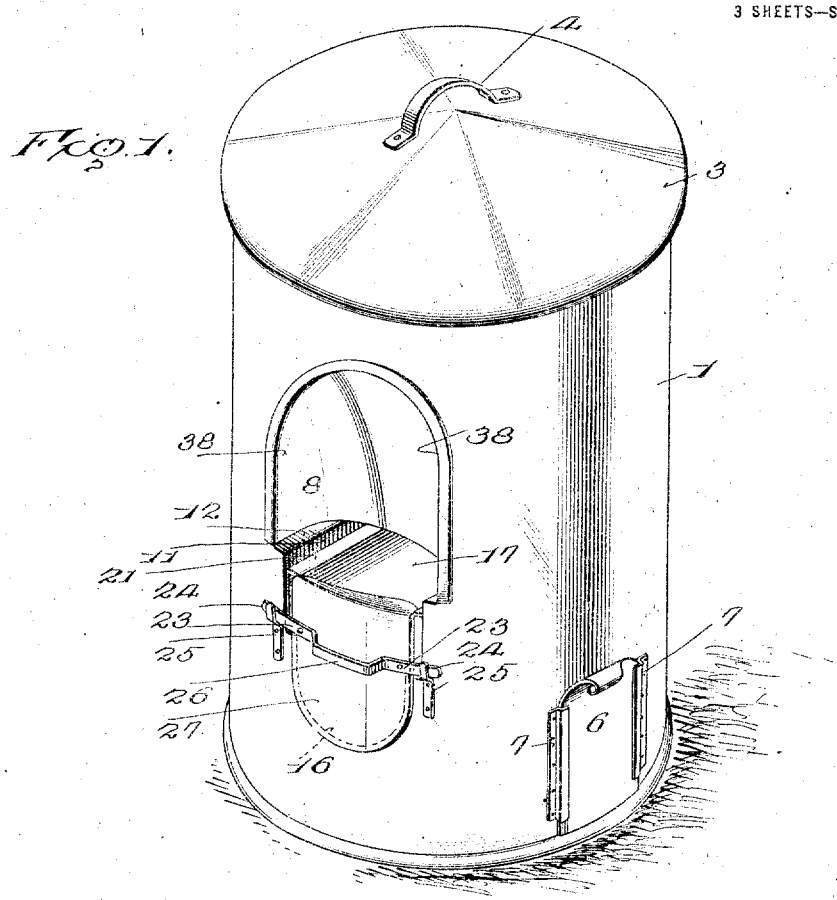

UNITED STATES PATENT OFFICE.

ELMER HICKS, OF DES MOINES, IOWA.

SANITARY NON-FREEZING WATERING-FOUNTAIN.

1,258,620.  Specification of Letters Patent.  Patented Mar. 5, 1918.

Application filed May 4, 1917. Serial No. 166,441.

*To all whom it may concern:*

Be it known that I, ELMER HICKS, a citizen of the United States, residing at Des Moines, in the county of Polk and State of Iowa, have invented certain new and useful Improvements in Sanitary Non-Freezing Watering-Fountains, of which the following is a specification.

This invention relates to stock and poultry watering fountains and has as its primary object to provide a fountain of this class which will be thoroughly sanitary and which will be kept in such condition and which, furthermore, is constructed and arranged to prevent freezing of water therein during winter months.

It is one aim of the present invention to provide a fountain of the class mentioned, the several parts of which may be readily separated and thoroughly cleaned and in which there will be no crevices in which sediment or dirt may collect.

It is another object of the invention to so construct the fountain that the same will be entirely automatic in its action and that all water will be drained from the reservoir when the water has been consumed by the stock or when the reservoir is intentionally drained so that if the use of the fountain is to be discontinued for any length of time it is only necessary to drain the water therefrom and set the fountain aside without fear of rusting of the fountain due to any water left remaining therein.

Another aim of the invention is to provide means for so supporting the trough of the fountain that the said trough may be at any time conveniently removed from the fountain casing without likelihood of spilling the water contained therein.

Another aim of the invention is to provide means for so supporting the reservoir within the fountain casing as to expose but a minimum area of the surface of the reservoir to the air and thus further insure against freezing of the water therein.

The invention further aims to so construct the reservoir of the fountain that the same will not be liable to buckle or become otherwise distorted due to the weight of the water and the suction force created by the flow of water from the said reservoir.

The invention has as a further object to so construct the fountain that the stock will experience no discomfort in drinking therefrom.

One form of the invention has as its object the automatic feeding of water from the reservoir.

In the accompanying drawings:

Figure 1 is a perspective view of one embodiment of the present invention;

Fig. 2 is a vertical transverse sectional view;

Fig. 3 is a horizontal sectional view on the line 3—3 of Fig. 2;

Fig. 4 is a vertical sectional view on the line 4—4 of Fig. 2;

Fig. 5 is a perspective view of the trough removed from the fountain casing;

Fig. 6 is a vertical transverse sectional view illustrating another embodiment of the invention;

Fig. 7 is a horizontal sectional view on the line 7—7 of Fig. 6;

Fig. 8 is a fragmentary perspective view of a portion of the casing of the device.

The reservoir and trough of the fountain heretofore referred to are arranged within a sheet metal casing, which is indicated in general by the numeral 1, and which is cylindrical in form, the casing having a bottom 2 and being provided with a removable top or lid 3 having a handle 4. Any suitable heating device, such, for example, as a lamp 5, is disposed within the lower portion of the casing and rests upon the bottom 2 and access may be had to the heating device through an opening in one side of the wall of the casing, which opening may be closed by a door 6 slidably fitting at its lateral edges in guides 7 at the opposite sides of the said opening.

In order that stock and poultry may reach the trough through the wall of the casing 1, the said casing is formed in its said wall at diametrically opposite points with openings 8 and 9. If desired, however, the opening 9 may be alone provided for drinking. Mounted in any suitable manner within the casing 1 are supporting members, indicated in general by the numeral 10, these members extending in parallel relation between the openings 8 and 9 and each terminating at its ends at corresponding sides of the said openings. Each of the said supporting members comprises a plate 11 having its upper edge flanged to provide a supporting ledge 12 which ledges serve to support the reservoir in a manner which will be presently explained. The lower edge of each plate 11 is provided with a flange including a horizontally disposed portion 13 which extends inwardly from the opening 8 slightly beyond the center of the casing, a portion 14 which is inclined upwardly toward the opening 9 from the inner end of the portion 13 of the said flange, and a portion 15 which extends from the upper end of the portion 14 to the said opening 9. The portions 15 of the flanges constitute a support for that end of the trough next adjacent the opening 9, when the trough is in position within the casing 1, and the portions 14 and 13 serve to support the said end of the trough as the trough is being withdrawn from the casing in a manner to be presently explained. It will be observed that the ledges 12 extend from their respective plates toward the adjacent sides of the wall of the casing, whereas the flanges comprising the portions 13, 14 and 15 project toward each other, or, in other words, toward the center of the said casing. By reference to the drawings it will be observed that the lower wall of the opening 9 is horizontally disposed and that the said opening is substantially semi-circular. However, while the upper portion of the opening 8 corresponds to the shape of the opening 9, the lower portion of the said opening 8 extends below the plane of the lower wall of the said opening 9, as indicated by the numeral 16, this extension being slightly narrower than the opening 8 itself but of a width to accommodate the trough which will presently be described. It will also be observed that the flange portions 15 of the supporting members 10 occupy the same horizontal plane as the lower wall of the opening 9 and that, consequently, the flange portions 13 occupy a lower plane. The trough comprises a substantially semi-cylindrical body 17 having front and rear end walls, indicated respectively by the numerals 18 and 19, transversely curved to conform to the curvature of the wall of the casing 1, the trough being provided with false end walls 20 which are inclined so as to avoid sharp corners within the trough in which sediment or dirt would be likely to collect. The body of the trough is provided at its upper longitudinal edges with outwardly projecting flanges 21 which flanges are designed to ride over the flange portions 13, 14 and 15 of the supporting member 10 and to rest at their rear ends upon the last-mentioned ones of the said portions. In order to provide against longitudinal displacement of the trough when in place within the casing, the rear end wall 19 is provided with an overturned lip 22 designed to be engaged over the lower wall of the opening 9, as clearly shown in Fig. 2 of the drawings. In order to support the forward end of the trough there is secured to the end wall 18 a transversely extending bar 23 having its ends projecting beyond the sides of the said wall to provide supporting lugs 24 designed to be engaged in supporting brackets 25 secured upon the outer side of the wall of the casing 1 at opposite sides of the lower portion or extension 16 of the opening 8. The said projecting ends of the bar 23 are so located that when engaged in the brackets 25 the trough will be supported in true horizontal position. In order that the trough may be conveniently handled the intermediate portion of the bar 23 is slightly outwardly bowed to form a handle 26 and it will be understood that by grasping the handle, after having first disengaged the lip 22 from the bottom wall of the opening 9, the trough may be slid forwardly, the rear ends of its flanges 21 riding over the flange portions 15 of the supporting members 10 and downwardly along the inclined flange portions 14 and thence along the flange portions 13. In such withdrawing movement of the trough the rear end thereof will lower as its flanges travel down the flange portion 14 and the forward portion of the body of the trough may be allowed to lower into the extension 16 of the opening 8. Thus the rear end of the trough is at all times supported during the withdrawing movement and yet is permitted to lower in such a manner as to clear the discharge spout which projects below the bottom of the reservoir as will be presently explained. For this reason it is possible to withdraw and replace the trough without tilting the same and, consequently, without spilling water from the trough into the casing 1. In order that the extension 16 of the opening 8 may be closed when the trough is in position within the casing, the end wall 18 of the said trough is provided with a downward extension constituting an apron 27 serving the purpose stated.

The reservoir of the fountain comprises a cylindrical body 28 having a closed downwardly bulged bottom 29 and a top 30, which is also concave or downwardly bulged and the said bottom 29 is provided centrally with a discharge spout 31 leading from the lowest portion of the said bottom so that all water may be permitted to drain from the reservoir through said spout. The flow of water from the reservoir through the spout is controlled by any suitable valve 32 of the cut-off type arranged within said spout. The top 30 is provided centrally with a nipple 33 and removably fitted therein is a plug 34. Secured upon the top 30 and surrounding the opening defined by the nipple 33 is an annular flange 35 defining a funnel, it being understood that water may be introduced into the tank by pouring into the funnel after removing the said plug 34. The reservoir is designed to be disposed within the casing 1 in the position shown in the several figures of the drawings and with its bottom resting upon the supporting ledges 12 of the members 10 and the said reservoir is centered with relation to the wall of the casing by means of several spacing lugs or wings 36 arranged at intervals about the inner surface of the wall of the said casing. In its wall 28 the reservoir is provided at diametrically opposite points, in the event that both the openings 8 and 9 are employed or at one side only if the opening 8 alone is employed, with inward bulges 37 designed to be positioned opposite the said openings 8 and 9 when the reservoir has been introduced into the casing 1 and properly positioned. These inward bulges, of course, permit the stock to have ready access to the trough. In order to exclude cold air from the space between the reservoir 28 and casing wall 1, the said casing wall is provided upon its inner side with inwardly projecting walls 38 which extend along the sides and top of the openings 8 and 9 and across the said openings opposite the bulges 37.

In that form of the invention shown in Figs. 7 and 8 of the drawings, the reservoir is of somewhat different construction from the reservoir shown in the other figures of the drawings although the fountain is otherwise constructed as heretofore described. In this latter form of the invention the reservoir comprises a body 39 having a downwardly bulged top 40 into which opens the upper end of a filling pipe, indicated by the numeral 41. The lower end of this filling pipe extends into a water leg 42 which opens at its upper end through the bottom of the reservoir and which is provided at its lower end with a drain valve 43. In this structure water poured into the concavity of the top 40 will flow down the pipe 41 and into the said water leg, entering the reservoir. In order that the air within the reservoir may be displaced, a vent pipe 44 is secured at its upper end to the top 40 and near its upper end is provided with a vent opening 45. The lower end of the pipe 44 extends into the trough of the fountain and it will be understood that as the water level rises within the reservoir the displaced air will enter through the opening 45 into the pipe 44 and will bubble up through the water into the trough. On the other hand, when the water level in the trough lowers beyond the lower or discharge end of the spout 31 air will enter the reservoir through the vent pipe 44. In order to protect the lower end of the pipe 44 and prevent freezing thereof, a cylindrical shield 46 depends from the bottom of the reservoir and surrounds the said lower end of the vent pipe.

Having thus described the invention, what is claimed as new is:

1. In a watering fountain, a casing, a reservoir supported within said casing, a stepped supporting member within the casing below the reservoir, a trough removably arranged within the casing and at one end supported by one portion of said stepped supporting member, means for supporting the other end of the trough, and a discharge spout leading from the reservoir into the said trough, the first-mentioned end of the said trough being designed to be supported and permitted to lower by another portion of the said stepped supporting member as the trough is withdrawn from the casing, whereby to permit the trough to be withdrawn in a horizontal position and to clear the said discharge spout.

2. In a watering fountain, a casing, spaced supporting members arranged within the casing, the wall of the casing having an opening and the said supporting members terminating at said opening, a reservoir disposed within the casing and having its bottom resting upon the said supporting members, a flange upon each supporting member having portions relatively vertically displaced, and a connecting inclined portion, a trough having elements to rest upon the said flanges and to move along the same, the trough being adapted to be withdrawn from said casing through said opening in the wall thereof, a discharge spout leading from the bottom of said reservoir into said trough.

3. In a watering fountain, a casing having an opening in the wall thereof, which opening has a downward extension, a reservoir within the casing, spaced supporting members within the casing, said supporting members being provided each with stepped supporting portions, a trough arranged within the casing and having portions resting upon the said stepped supporting portions and movable therealong as the trough is slid into and out of the casing through said opening in the wall of the casing, the higher stepped supporting portions supporting one end of the trough when the trough is in position within the casing and the trough in its withdrawing movement being arranged at its other end to lower into the extension of the opening in the wall of the casing, means for supporting the last-mentioned end of the trough, and a discharge spout leading from the bottom of the reservoir into said trough and located opposite the lower stepped supporting portions.

4. In a watering fountain, a casing having an opening in the wall thereof, which opening has a downward extension, a reservoir within the casing, spaced supporting members within the casing, said supporting members being provided each with stepped supporting portions, a trough arranged within the casing and having portions resting upon the said stepped supporting portions and movable therealong as the trough is slid into and out of the casing through said opening in the wall of the casing, the higher stepped supporting portions supporting one end of the trough when the trough is in position within the casing and the trough in its withdrawing movement being arranged at its other end to lower into the extension of the opening in the wall of the casing, means for supporting the last-mentioned end of the trough, and a discharge spout leading from the bottom of the reservoir into said trough and located opposite the lower stepped supporting portions, the last-mentioned end of the trough being provided with a depending extension designed to close the extension of the opening in the wall of the casing when the trough is in position within said casing.

5. In a watering fountain, a casing having an opening in the wall thereof, which opening has a downward extension, a reservoir within the casing, spaced supporting members within the casing, said supporting members being provided each with stepped supporting portions, a trough arranged within the casing and having portions resting upon the said stepped supporting portions and movable therealong as the trough is slid into and out of the casing through said opening in the wall of the casing, the higher stepped supporting portions supporting one end of the trough when the trough is in position within the casing and the trough in its withdrawing movement being arranged at its other end to lower into the extension of the opening in the wall of the casing, supporting brackets upon the wall of the casing at the opposite sides of the opening therein, and a bar secured upon the last-mentioned end of the trough and having its ends projecting to seat within said supporting brackets.

6. In a watering fountain, a casing having an opening in the wall thereof, a reservoir removably supported within the casing, a trough arranged within the casing below the reservoir and having an end positioned within the lower side of the said opening in the casing, the reservoir having an outlet arranged to discharge into the said trough, the wall of the reservoir opposite the said opening in the casing being inwardly bulged, and the said casing being provided interiorly with a flange extending around the sides and top of the said opening and a portion extending between the sides of the flange and into the bulge into the said wall of the reservoir.

7. In a watering fountain, a casing, a reservoir supported therein, a trough within the casing beneath the reservoir, the reservoir having a discharge opening into the trough, a water leg extending downwardly from the bottom of the reservoir and laterally displaced with relation to the trough, the reservoir being provided in its top with an opening, and a filling pipe leading from the opening downwardly through the reservoir with its discharge end extending into the said water leg.

In testimony whereof I affix my signature.

ELMER HICKS.